(12) United States Patent
Goerend

(10) Patent No.: US 11,313,461 B2
(45) Date of Patent: Apr. 26, 2022

(54) ADJUSTABLE STATOR FOR TORQUE CONVERTER

(71) Applicant: David J. Goerend, Saint Lucas, IA (US)

(72) Inventor: David J. Goerend, Saint Lucas, IA (US)

( * ) Notice: Subject to any disclaimer, the term of this patent is extended or adjusted under 35 U.S.C. 154(b) by 0 days.

(21) Appl. No.: 16/948,581

(22) Filed: Sep. 24, 2020

(65) Prior Publication Data

US 2021/0003214 A1 Jan. 7, 2021

Related U.S. Application Data

(63) Continuation of application No. 15/832,234, filed on Dec. 5, 2017, now Pat. No. 10,788,124.

(60) Provisional application No. 62/514,191, filed on Jun. 2, 2017.

(51) Int. Cl.
| | |
|---|---|
| *F16H 61/50* | (2006.01) |
| *F16H 41/02* | (2006.01) |
| *F16H 41/30* | (2006.01) |
| *F16H 41/24* | (2006.01) |
| *F16H 45/02* | (2006.01) |

(52) U.S. Cl.
CPC ............. *F16H 61/50* (2013.01); *F16H 41/02* (2013.01); *F16H 41/24* (2013.01); *F16H 41/30* (2013.01); *F16H 2045/0215* (2013.01)

(58) Field of Classification Search
CPC .......... F16H 41/30; F16H 61/50; F16H 41/24; F16H 61/30; F16H 41/02
See application file for complete search history.

(56) References Cited

U.S. PATENT DOCUMENTS

| | | | |
|---|---|---|---|
| 3,646,755 A * | 3/1972 | Sherman | ................. F16H 41/26 60/355 |
| 4,848,084 A | 7/1989 | Wirtz | |
| 5,935,042 A | 8/1999 | Thomas et al. | |
| 6,996,978 B2 | 2/2006 | Goerend | |
| 7,785,229 B2 | 8/2010 | Maddock | |
| 2012/0017579 A1 | 1/2012 | Goerend | |

* cited by examiner

*Primary Examiner* — Abiy Teka
(74) *Attorney, Agent, or Firm* — McKee, Voorhees & Sease, PLC

(57) ABSTRACT

A torque converter is provided with a stator having adjustable fluid flow holes for changing the K-factor of the torque converter, as needed. The stator includes a base plate with fluid flow openings and an adjustable plate with fluid flow openings. The plates matingly engage, such that the fluid openings are adjacent one another. The degree of overlap of the openings can be varied from fully aligned to substantially misaligned by rotating the adjustable plate relative to the base plate, and thereby controlling the fluid flow through the openings. In alternative embodiments the stator holes can be automatically opened and closed in response to changes in fluid pressure in the torque converter, via reed values or spring biased balls.

21 Claims, 15 Drawing Sheets

ADJUSTABLE STATOR FOR TORQUE CONVERTER

CROSS-REFERENCE TO RELATED APPLICATIONS

This application is a Continuation Application of U.S. Ser. No. 15/832,234, filed on Dec. 5, 2017, which claims priority under 35 U.S.C. § 119 to provisional application Ser. No. 62/514,191, filed Jun. 2, 2017, all of which are herein incorporated by reference in their entirety.

FIELD OF THE INVENTION

The invention is directed toward a torque converter having an adjustable stator for controlling fluid flow through the converter orifices, and thereby adjust the K-factor without exchanging a different stator.

BACKGROUND OF THE INVENTION

Torque converters have been known and used in combination with automatic transmissions of automobiles for quite some time. Generally, a torque converter consists of a housing, an impeller or pump, a turbine, a stator, and a lock-up clutch.

The impeller is hemispherical with an outer wall having inner and outer surfaces, and a plurality of vanes radially mounted to the concave inner surface of the impeller wall. The turbine is rotatably mounted within a back wall, and also contains a plurality of vanes opposite the impeller vanes. The impeller wall is welded to the converter body to form an enclosed housing for the torque converter. The stator is located between the impeller and the turbine. The impeller has an input shaft operatively connected to the engine drive shaft. The turbine has an output shaft attached to the transmission input shaft so as to rotate the output shaft of the transmission.

Many improvements have been made to torque converters to improve operation and efficiency. For example, see Applicant's patent, U.S. Pat. No. 6,996,978, relating to an improved stator for the torque converter. Also, see the General Motors patent, U.S. Pat. No. 6,959,239, which discloses a cooling control for a torque converter; the Nissan patent, U.S. Pat. No. 7,264,574, which discloses a control device for the torque converter lock up; and the Daimlerchrysler U.S. Pat. No. 7,818,965, which relates to augmented output method and apparatus for a torque converter.

In use, fluid, such as oil, is added into the torque converter housing. When the engine shaft rotates the impeller, the fluid starts rotating as well. As the rotation speeds up, centrifugal forces cause the fluid to flow outward toward the impeller vanes. The impeller vanes direct the fluid towards the turbine vanes, wherein the force of the fluid causes the turbine to rotate in the same direction as the impeller. The turbine shaft rotates the transmission shaft, which causes the vehicle to begin moving. The orientation of the turbine vanes directs the fluid towards the center of the turbine, where the vanes of the stator direct the fluid back towards the impeller, and the fluid cycle is repeated. Initially, the impeller will be rotating at a much greater speed than the turbine, which results in energy loss between input from the motor and output from the transmission. However, when the vehicle reaches a higher speed (typically about 40 miles per hour), the impeller and turbine will be rotating at approximately the same speed. At this time, a lock-up clutch will mechanically connect the impeller and the turbine so that they rotate at exactly the same speed to transfer 100% of the power through the torque converter.

"Stall" refers to the maximum speed which the motor can achieve against the torque converter when the turbine is locked and prevented from rotating. The revolutions per minute (RPM) achieved is a function of the engine torque and the converter design. Generally, the higher the stall, the less efficient the converter is at high speeds. A high stall torque converter allows the engine to get into the power band more quickly. A torque converter optimized for drag racing will have a much higher stall speed than a torque converter for a standard street vehicle. Higher stall speeds have lower efficiency, but provides the benefit of a quicker start from a stopped position. On a street car, lower stall is desired, which improves gas mileage and reduces heat generation.

Ideally, the torque converter for racing should be set up so that the stall speed is close to the RPM at which the engine reaches maximum torque, so as to provide the greatest initial acceleration.

For example, a drag racing car typically has a stall at 1,500-6,000 RPM. As the RPM increases, the horsepower increases. The higher the torque, the easier it is to start the car moving. Performance engines generally don't make power until approximately 2,000-3,000 RPM, such that an engine that makes torque at a higher RPM requires a higher stall speed so that the engine is closer to its power band when taking off from the starting line. Thus, with the vehicle on the starting line and the transmission brake on, the driver can hit full throttle and the engine will wind up to peak torque with the car just sitting there, and when the transmission brake is released, the transmission engages and the car instantly launches at close to the peak torque.

The K-factor provides a relative indication of the efficiency of the torque converter. The K-factor is defined as the engine speed in RPM divided by square root of the engine torque output.

In the prior art, when it is desired to change the stall speed, it is necessary to disassemble the torque converter, and substitute a different stator having different vanes and openings. This necessitates an inventory of different stators having various performance designs. For example, a first stator having less vanes and larger openings or windows has a lower K-factor compared to a second stator having more vanes and smaller openings. The process of changing the stator is time consuming, and often must be repeated until the desired K-factor or stalls speed is achieved following repeated testing. Therefore, there is a need for a simpler method and means for quickly and easily changing the K-factor of a torque converter.

Accordingly, a primary objective of the present invention is the provision of an adjustable stator for use in a torque converter for variable K-factor settings.

Another objective of the present invention is a provision of a two-part stator wherein the parts can be slideably moved relative to one another so as to vary the size of the oil flow openings in the stator.

A further objective of the present invention is a provision of a two-part stator which can be adjusted to different sized oil openings by loosening threaded fasteners.

Still another objective of the present invention is the provision of a torque converter stator which is infinitely adjustable to achieve a desired K-factor of a torque converter.

Yet another objective of the present invention is the provision of a method for varying the K-factor torque converter using a single stator.

A further objective of the present invention is a provision of a method of changing the K-factor of a torque converter by altering the fluid and flow openings of the stator.

Another objective of the present invention is a method of changing the K-factor of the torque conveyor by adjusting fluid flow through the stator.

Still another objective of the present invention is a provision of an adjustable stator for torque converter which is economically manufactured, quick and easy to adjust, and durable in use.

These and other objectives become apparent from the following description of the invention.

The torque converter of the present invention utilizes an adjustable stator which allows the K-factor of the torque converter to be quickly and easily changed, as desired. This stator includes opposing plates which can be adjustably fixed in various positions relative to one another so as to alter the size of the fluid flow openings in the plates. The fluid flow openings of the stator can be fully aligned or incrementally offset with respect to one another, thereby changing the K-factor of the torque converter. The plates are joined by fasteners extending through slots in one plate and threaded holes in the other plate. The fastener can be loosened to rotate the first plate relative to the second plate, and then tightened to fix the plates in position with the desired open area for the fluid flow openings.

SUMMARY OF THE INVENTION

The torque converter of the present invention includes an adjustable stator which allows fluid to flow through the orifices to be controlled, such that the K-factor can be adjusted, without changing to a different stator. The torque converter includes a base having a plurality of holes and an adjustment plate having a plurality of holes. The base plate and the adjustment plate are coupled for clockwise and counter clockwise rotation relative to one another, so that alignment of the holes in the base plate and the adjustment plate can vary from fully open to fully closed. The degree or size of overlap between the base plate holes and the adjustment plate holes determines the fluid flow thereto. The position of the adjustment plate relative to the base plate is fixed by a plurality of threaded fasteners which are tightened to secure the adjustment plate in a selected position, and loosened to allow the adjustment plate to be rotated relative to the base plate for changing the orifice overlap.

DETAILED DESCRIPTION OF THE INVENTION

Figure 14:
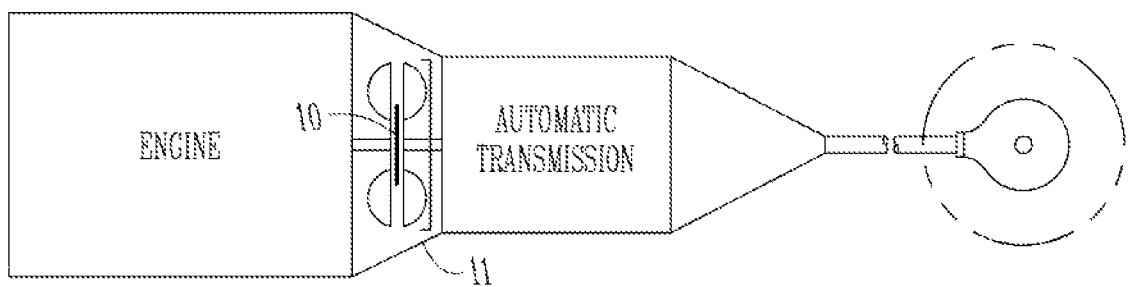
FIG. 14 is a schematic showing an engine, a torque convertor, and an automatic transmission for an automobile.

The adjustable converter stator 10 of the present invention includes a base plate 12 and an adjustable plate 14. The stator 10 allows the K-factor of the torque converter to be selectively adjusted, without the need to interchange multiple stators having different blades or openings. The stator 10 of the present invention is mounted in the torque convertor 11 (FIG. 14) in a manner similar to a conventional stator. However, the stator 10 allows the size of the oil openings to be adjusted without switching out to a different stator.

More particularly, the base 12 includes a plurality of oil holes 16 extending in a circle around the center mounting ring 18. The plate 14 also has a plurality of oil openings 20 extending in a circle around the center mounting opening 22.

Figure 7:
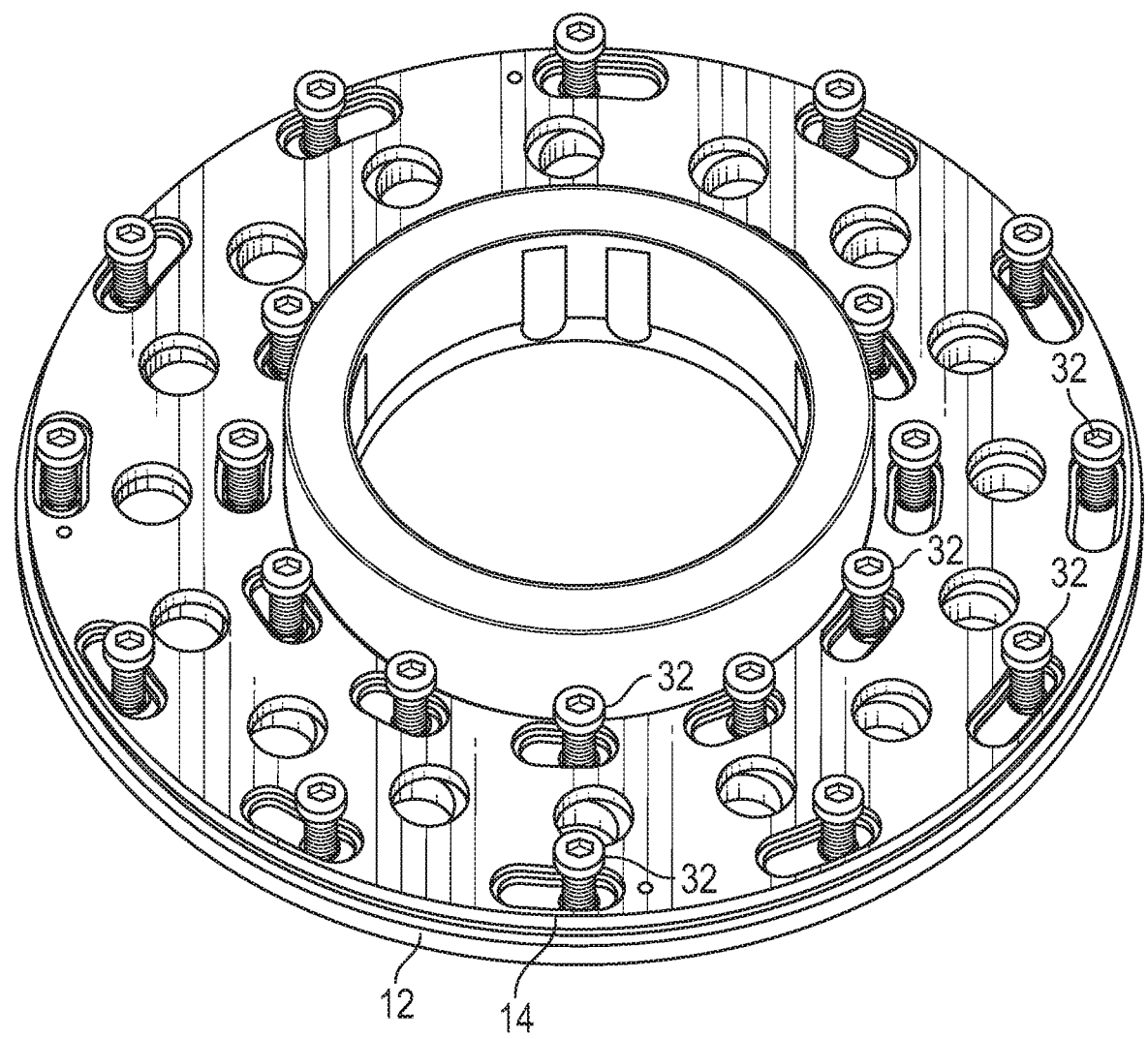
FIG. 7 shows the base and plate in the second position, with set screws loosened to allow adjustability of the plate relative to the base.
Figure 8:
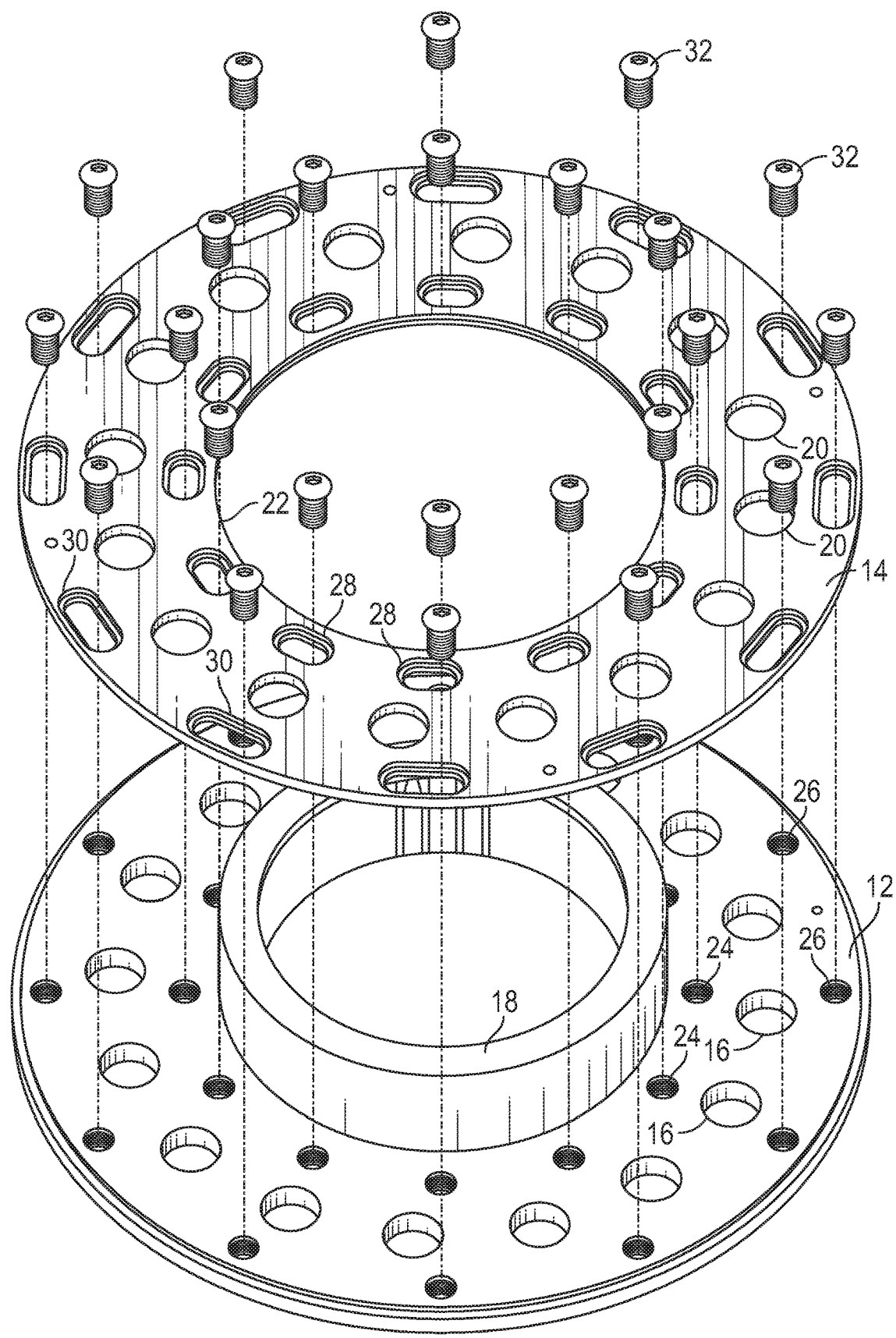
FIG. 8 is an exploded perspective view of the stator plates of FIGS. 1-7.

The plate 14 is mounted on the base 12, with the mounting ring 18 of the base 12 extending through the mounting opening 22 of the plate 14. In the embodiment shown in the Figures, the base 12 has an inner row of tapped or threaded holes 24 and an outer row of tapped or threaded holes 26. The plate 14 includes an inner row of elongated slots 28 and an outer row of elongated slots 30. Threaded screws or bolts 32 (FIG. 7) are adapted to extend downwardly through the slots 28, 30 and into the threaded holes 24, 26. With the fasteners 32 loosened, the plate 12 can be rotated clockwise and counter clockwise to adjust the alignment of the holes 20 of the plate 14 over the holes 16 of the base 12. Once the plate 12 is in the desired positions, the fasteners 32 are tightened to maintain the selected position.

Figure 1:
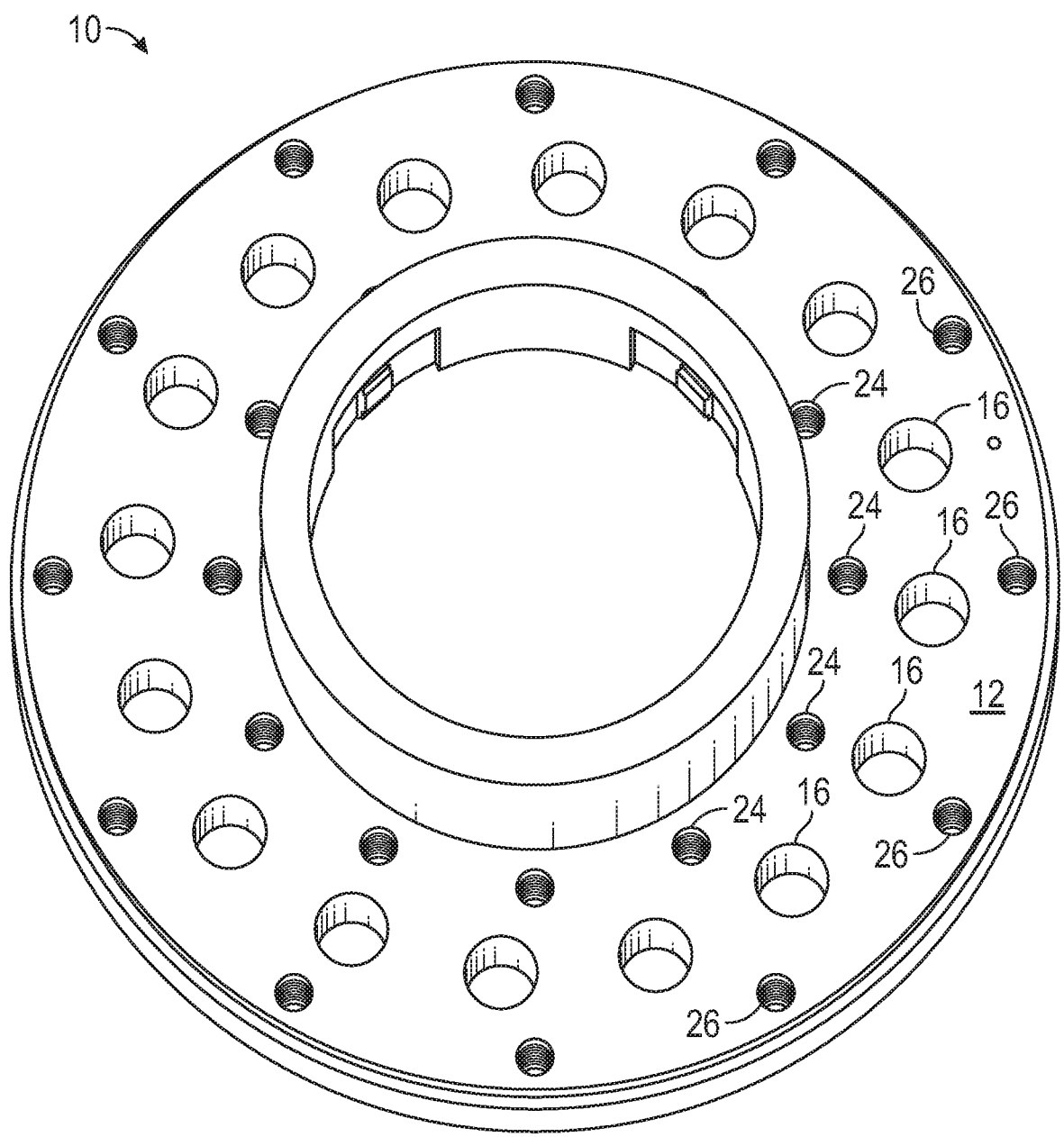
FIG. 1 is a view of a first embodiment of an adjustable stator, from one side of the base of the two-part stator, according to the present invention.
Figure 2:
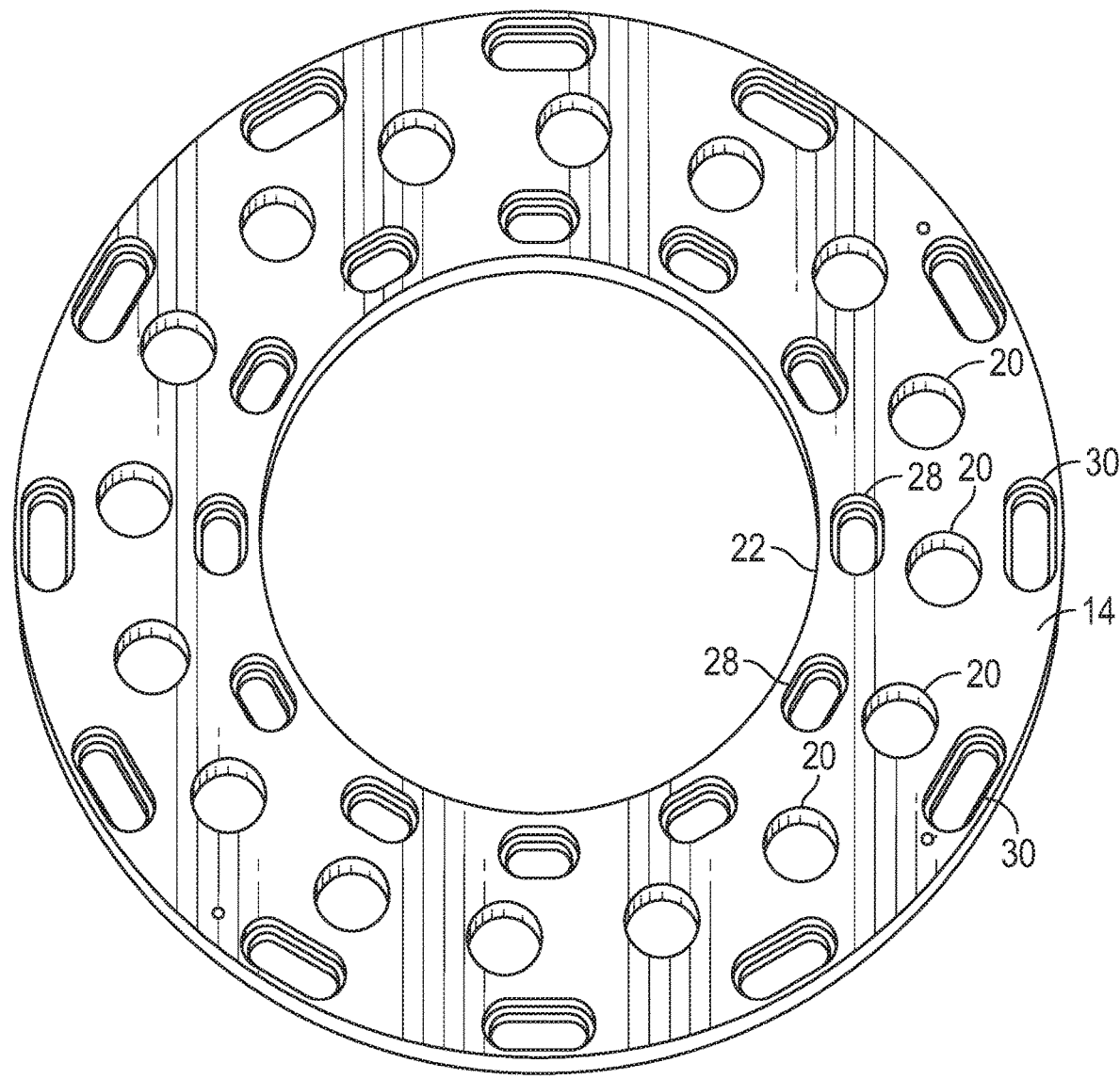
FIG. 2 shows the adjustable plate of the two-part stator, according to the present invention.
Figure 3:
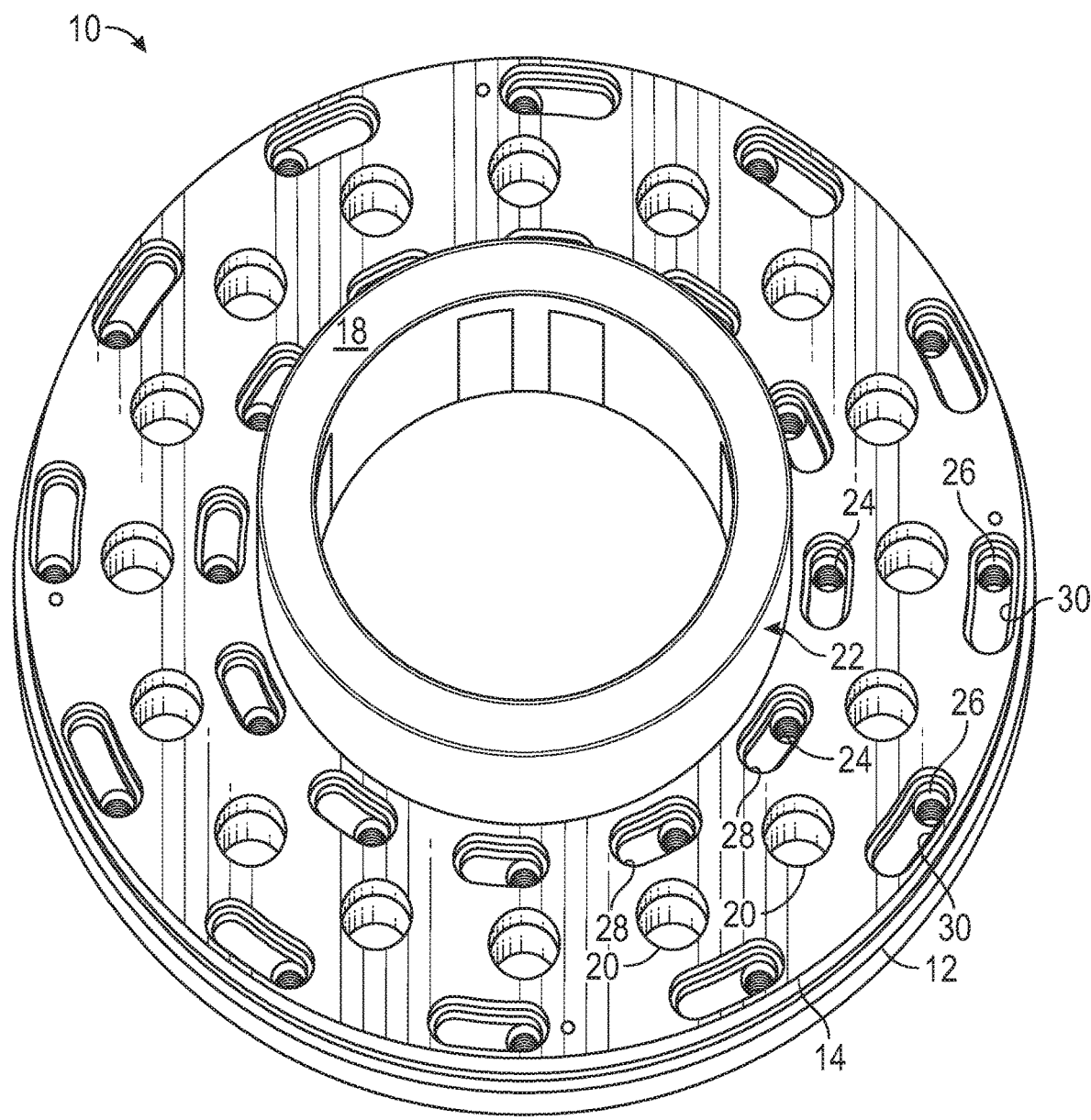
FIG. 3 shows the stator base and adjustable plate in an assembled condition, with the plate rotated to a first position wherein the base and plate holes are fully aligned and wide open.
Figure 4:
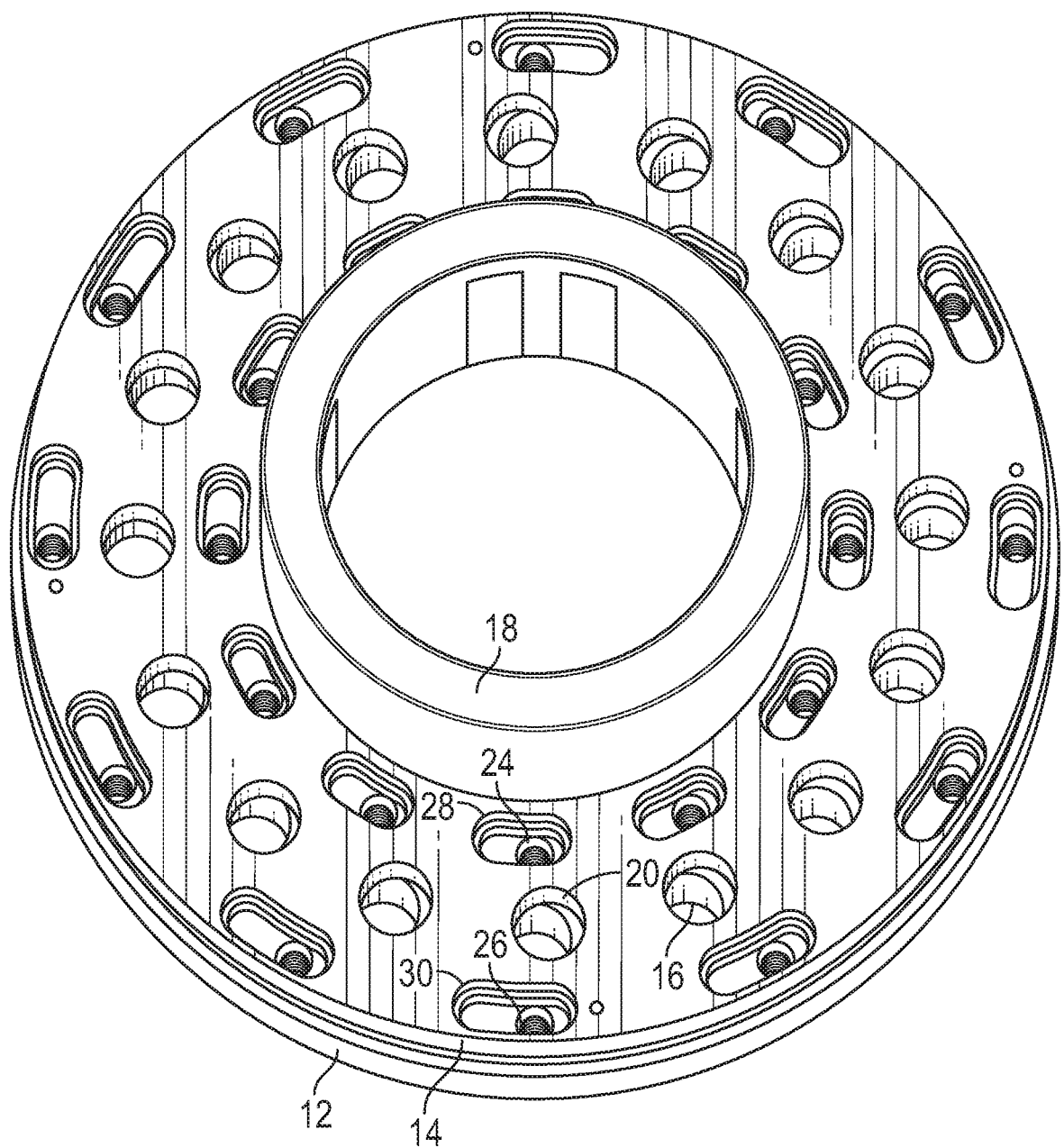
FIG. 4 shows the plate rotated counter clockwise to a second position, wherein the base and plate holes are offset approximately 25%.
Figure 5:
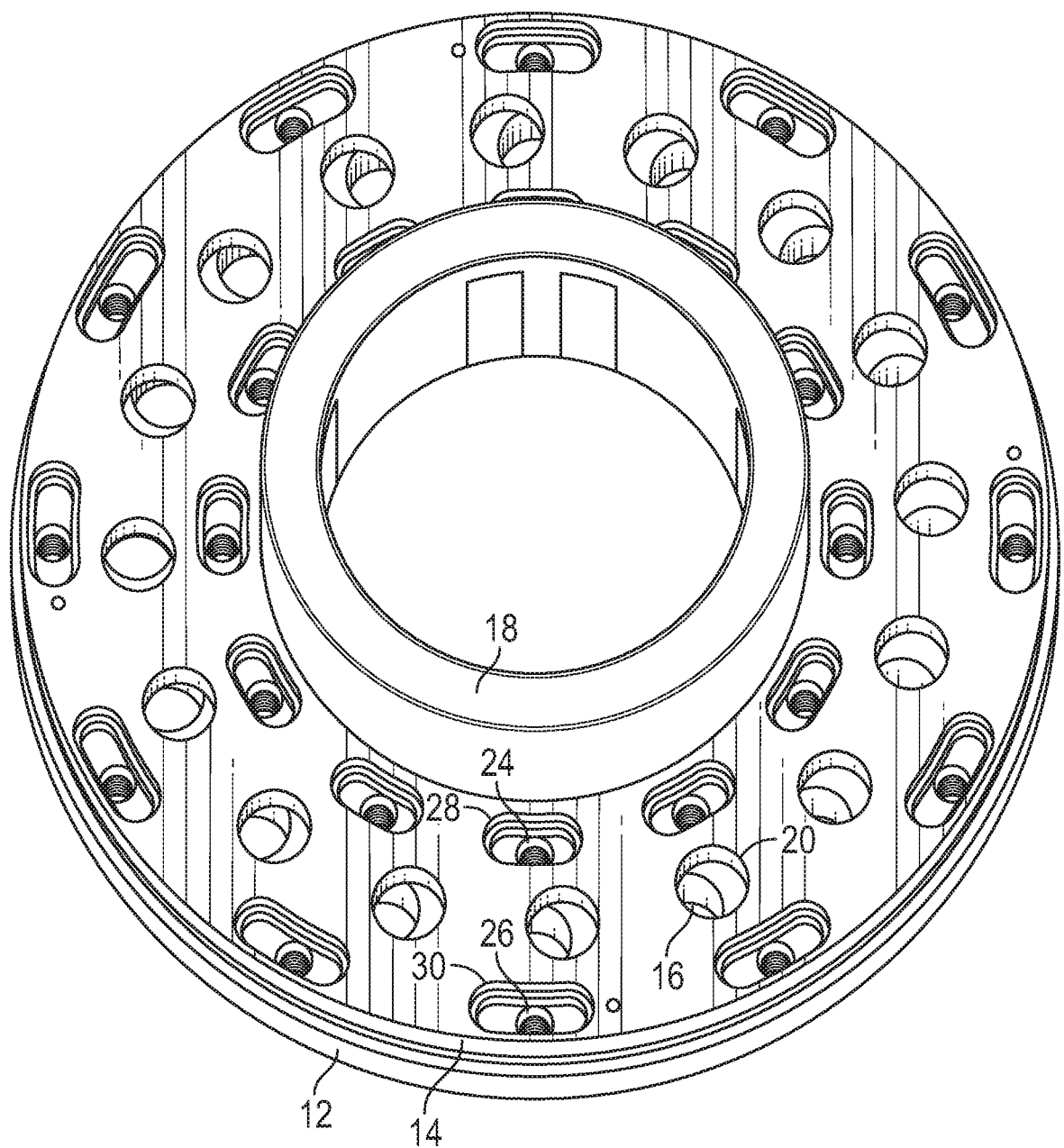
FIG. 5 shows the plate rotated counter clockwise to a third position with the base and plate holes offset approximately 50%.
Figure 6:
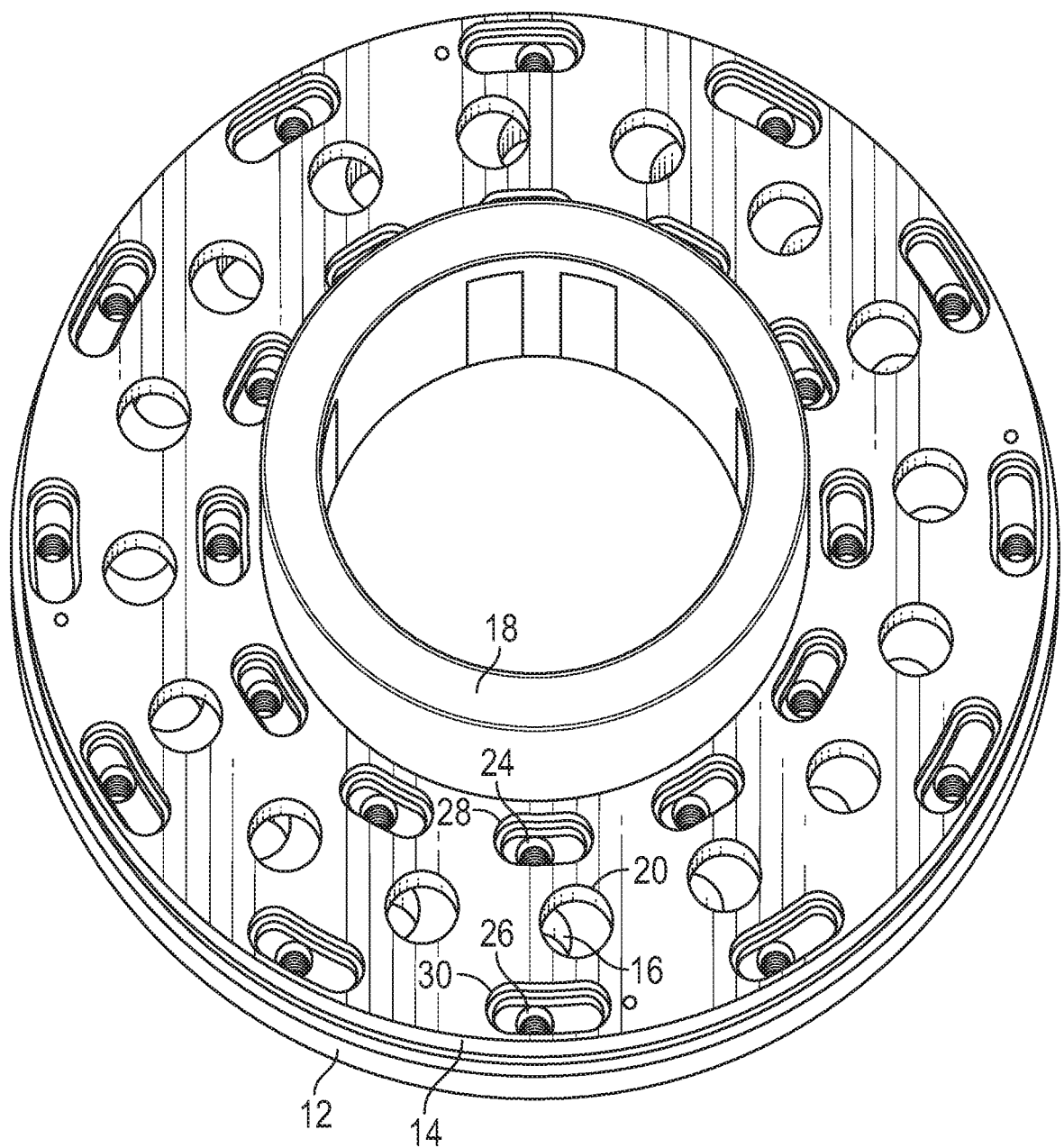
FIG. 6 shows the plate rotated counter clockwise to a fourth position with the base and stator holes offset or closed approximately 75%.
Figure 6A:
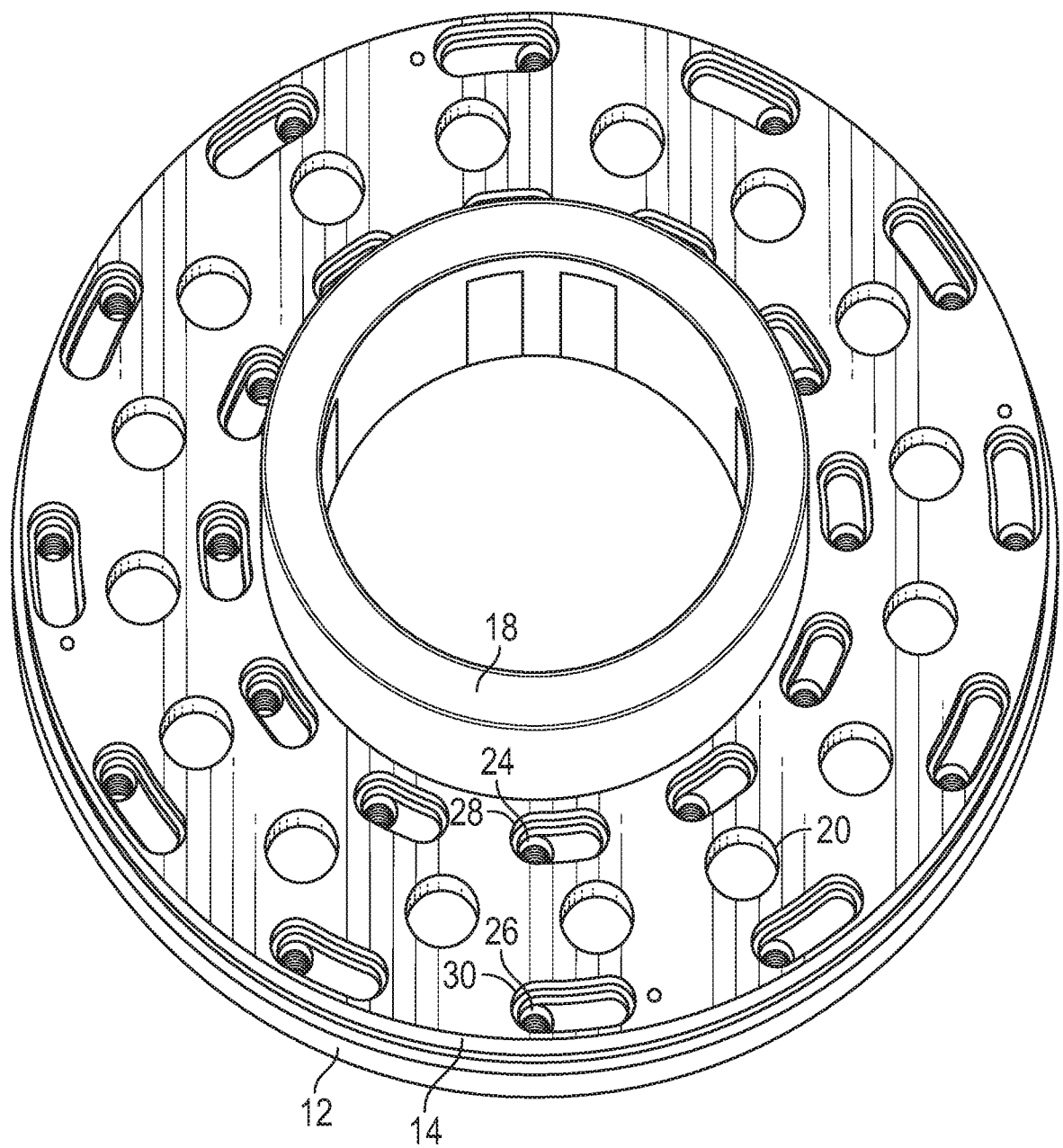
FIG. 6A shows the adjustable plate rotated to a fifth position, with the holes fully closed.

As shown in FIG. 3, the plate 14 is rotated clockwise so that the fasteners 32 are at the right end of the slots 28, 30 (as viewed from a 6 o'clock position), which fully aligns the holes 16, 20 for maximum fluid flow therethrough. In FIG. 4, the plate 14 is rotated counter clockwise so as to partially close the alignment of the holes 16, 20, approximately 25%. With continued counter clockwise rotation of the plate 14, as seen in FIG. 5, the holes 16, 20 are offset approximately 50%, with fasteners 32 being located approximately in the center of the slots 28, 30. Continued counter clockwise rotation of the plate 14 and so that the fasteners 32 are at the left end of the slots 28, 30 (viewed from the 6 o'clock position) nearly closes the alignment of the holes 16, 20 for minimum fluid flow therethrough.

By adjusting the alignment of the hole 16, 20 and thus the flow of oil or fluid therethrough, the K-factor of the torque converter can be increased or decreased, without having to exchange stators having a different number of vanes, a different pitch of vanes, and/or a different size of openings between vanes. Thus, the need for an inventory of different stators is eliminated with a single two-part stator 10 of the present invention.

Thus, the plate 14 can be adjusted relative to the base, to adjust the hole or orifice size to the desired K-factor, and then the screws or bolts 32 tightened to fix the position of the plate 14 relative to the base 12. Thus, the two-part stator 10 of the present invention replaces the multiple stators with different numbers of blades and fluid orifice sizes, as in conventional torque convertors, thus allowing adjustment of the stall speed of the torque converter.

In an alternative embodiment, automatic adjustment of the hole alignment in the stator 10 may be achieved. For example, a stator with a plurality of fluid holes is provided, along with a clutch liner to frictionally engage the turbine of the torque convertor. The holes maybe be closed when the vehicle is stationery so as to increase engine speed, without fighting the hydraulics of the torque converter. Then, as the vehicle starts to move, the turbine starts to rotate, the clutch friction is overcome so as to rotate the base to open the fluid holes, thereby increasing torque efficiency of the convertor.

Figure 9:
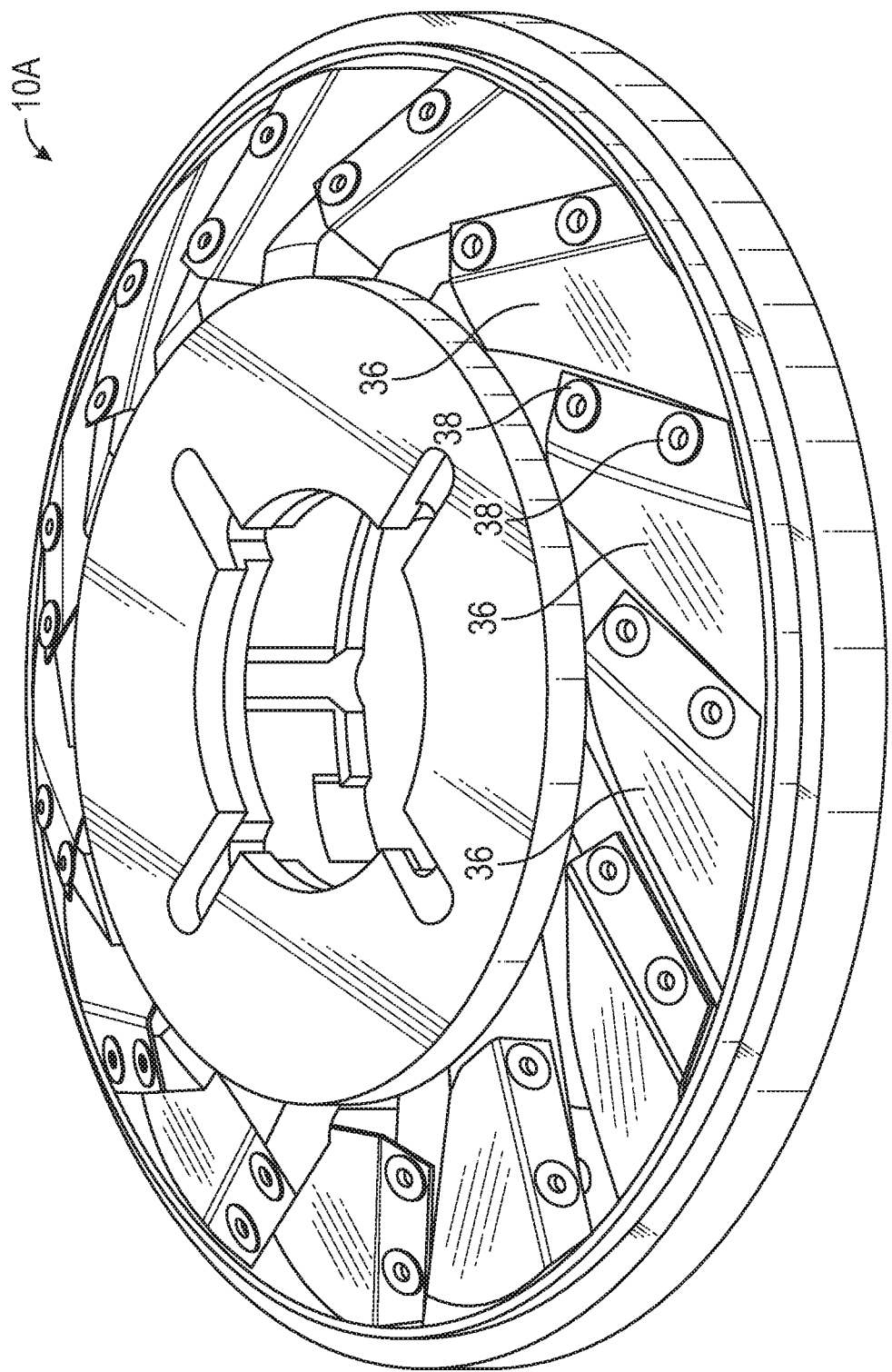
FIG. 9 is a partial perspective view of a second embodiment of an adjustable stator according to the present invention, and having reed valves to adjust the K-factor, and the reed valves in a closed position.
Figure 10:
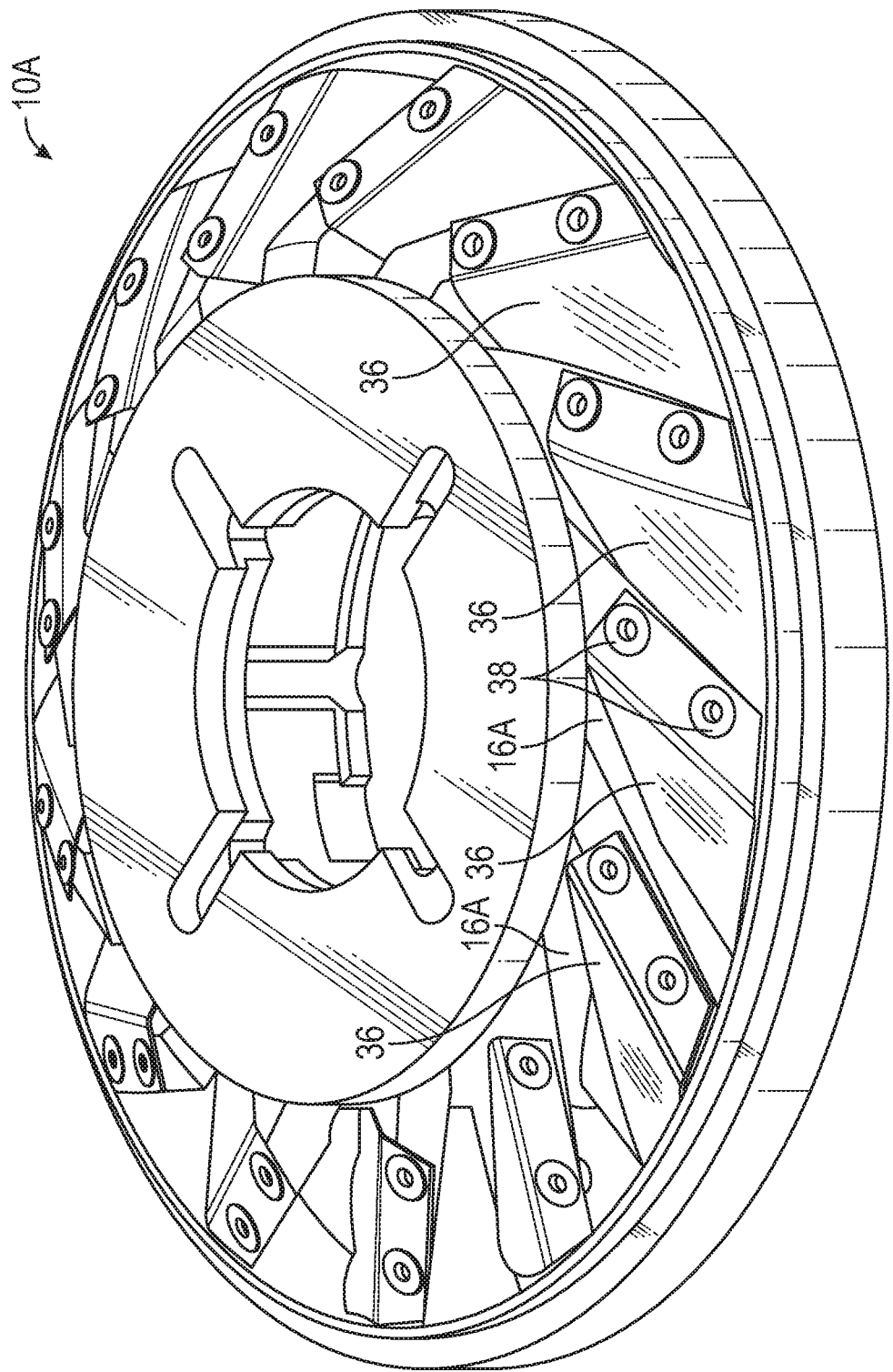
FIG. 10 is a view similar to FIG. 9 with the reed valves in an open position.

In yet another alternative embodiment, shown in FIGS. 9 and 10, the stator 10A has slots 16A for passage of oil. Each slot 16A is covered with a reed valve 36, such that the slots are closed, as seen in FIG. 9. The reed valves 36 are initially closed when the hydraulic pressure is minimal. As the fluid pressure increases, the reeds 36 move apart from the stator slots or openings 16A to increase the fluid flow therethrough, and thus adjust the K-factor of the torque converter. The reeds 36 may be attached to the stator 10A in any convenient manner, such as the rivets 38. Thus, one end of each reed valve is fixed to the stator, and the opposite end flexibly extends over the orifice.

Figure 11:
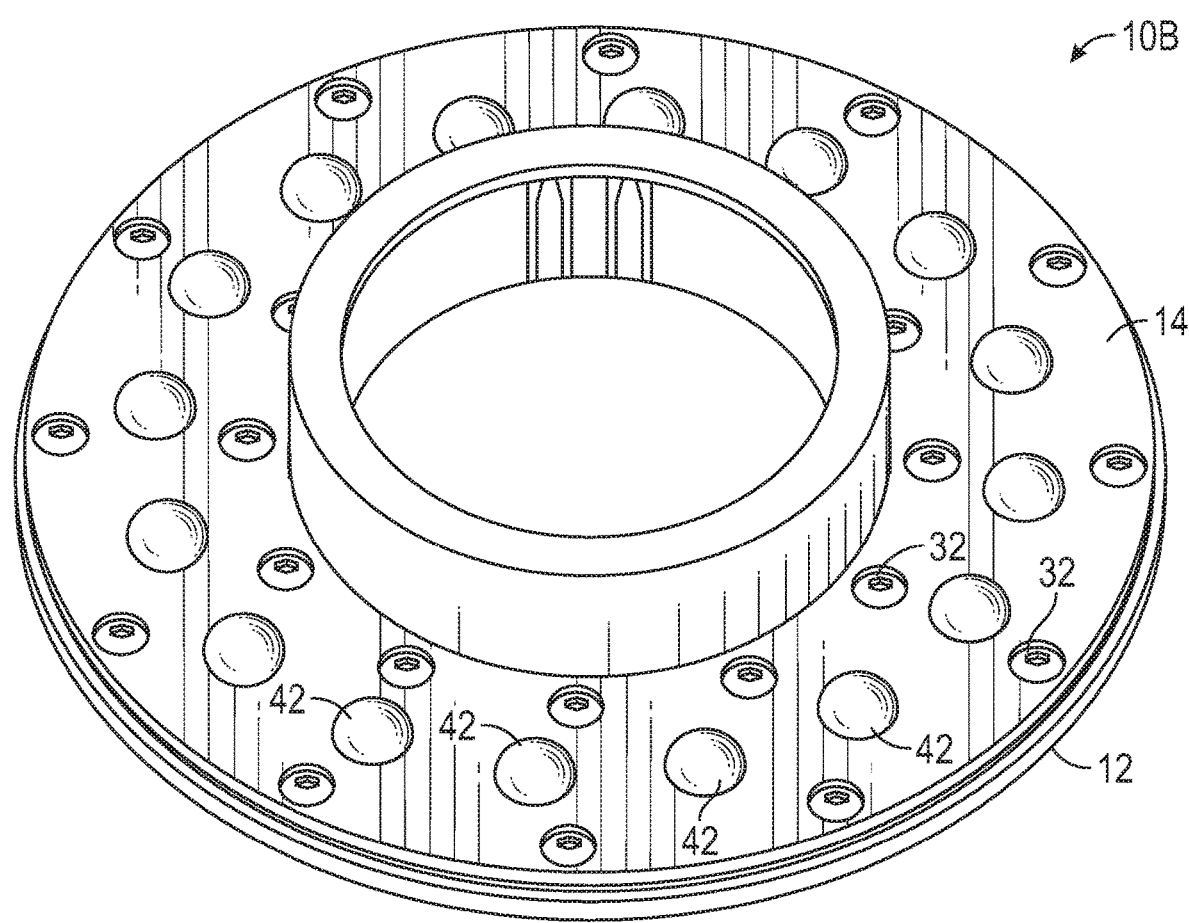
FIG. 11 is a perspective of a third embodiment of an adjustable stator according to the present invention, and having a ball and detent to adjust the K-factor, with the balls shown in a closed position.
Figure 12:
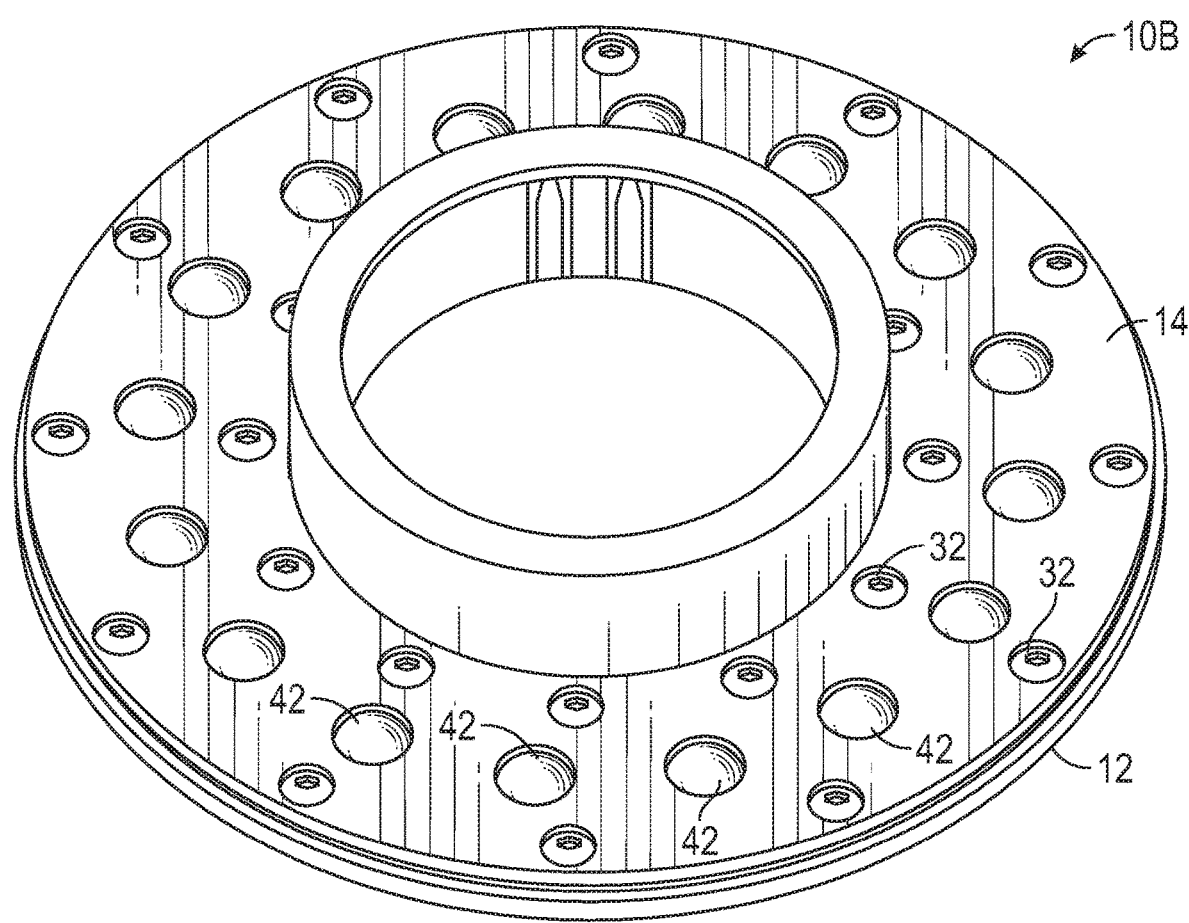
FIG. 12 is a view of the third embodiment with the balls in an open position.
Figure 13:
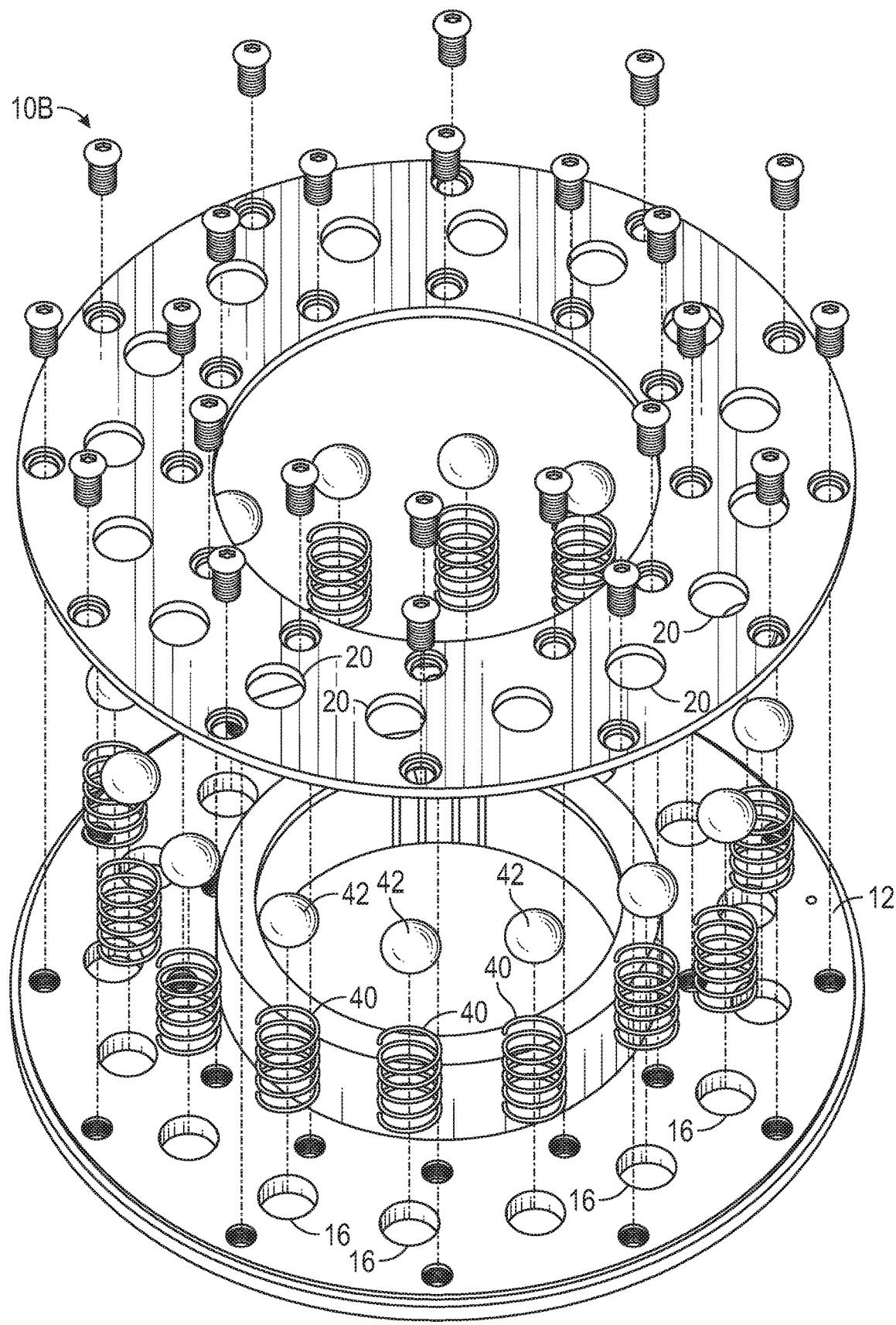
FIG. 13 is an exploded view of the third embodiment.

In still another alternative embodiment shown in FIGS. 11 and 12, the holes 20 in the upper plate of the stator 10B can be closed by a ball and spring detent assembly when the hydraulic pressure is minimal. The springs 40, which are seated or fixed in the holes 16 of the base 12, urge the balls 42 upwardly to close the plate holes 20. Then, when the hydraulic pressure increases to a pre-determined value, the spring force of the springs 40 is overcome so as to unseat the balls 42 with respect to the holes 20, thus increasing fluid flow through the holes, and lowering the K-factor.

Thus, in all embodiments, when the stator holes are closed, the K-factor is relatively high, and as the holes open, the K-factor adjusts downwardly until the holes are fully open.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An adjustable stator for a torque converter of a vehicle, comprising:
    a plate with a plurality of fluid openings;
    an automatic adjustment means to open and close the fluid openings to control fluid volume flowing through the openings in response to fluid pressure changes in the fluid openings as engine speed changes; and
    the automatic adjustment means initially closing the openings while the vehicle is stationary and then opening the openings after the vehicle is moving.

2. The adjustable stator of claim 1 wherein the adjustment means is a reed valve.

3. The adjustable stator of claim 1 wherein the adjustment means is a ball detent.

4. The torque converter of claim 3 wherein the ball opens and closes the orifice as the fluid pressure increases and decreases.

5. The torque converter of claim 3 wherein the balls open and close the openings as the fluid pressure increases and decreases.

6. The adjustable stator of claim 1 wherein the adjustment means is a clutch.

7. The adjustable stator of claim 1 wherein the adjustment means is set to actuate at a desired RPM.

8. The torque converter of claim 1 further comprising a spring biased ball positioned adjacent each orifice and movable between a seated position relative to the orifice when fluid pressure increases.

9. The torque converter of claim 1 further comprising a spring biased ball positioned adjacent each opening and movable between a seated and unseated positions relative to the opening in response to fluid pressure changes.

10. The adjustable stator of claim 1 wherein one of the plates has threaded apertures and the other plate has slots aligned with the apertures and the fasteners being bolts extending through slots and into the apertures for securing the plates together in a selected adjustment position when the bolts are tightened.

11. The torque converter of claim 1 wherein the orifice sizes are adjustable between fully open and fully closed.

12. A method of adjusting K-factor for a torque converter, comprising:
    orienting fluid flow openings in a pair of mating plates of a stator in the torque converter so that the openings are adjacent on another;
    moving only one of the mating plates to adjust alignment of the openings from fully aligned for maximum fluid flow through the openings of the mating plates to fully misaligned to stop fluid flow through the openings of the mating plates.

13. The method of claim 12 further comprising fixing the plates in a selected position.

14. The method of claim 13 wherein the plates are fixed together using threaded fasteners extending through one plate and into the other plate.

15. The method of claim 14 wherein the fasteners are loosened to adjust the plates to vary the opening overlap.

16. The method of claim 12 wherein the alignment is adjustable to at least 50% misaligned.

17. The method of claim 12 wherein the alignment is adjustable to at least 75% misalignment.

18. A method of adjusting fluid flow through a stator of a torque converter, comprising:
    automatically opening and closing fluid flow openings in the stator in response to fluid pressure changes in the fluid flow openings; and
    the fluid flow openings being initially closed when fluid pressure in the fluid flow openings is below a predetermined value and being opened when the fluid pressure exceeds the predetermined value.

19. The method of claim 18 wherein the opening and closing of the openings is provided by flexible reed valves overlying the openings.

20. The method of claim 18 wherein the opening and closing of the openings is provided by spring biased balls overlying the openings.

21. The method of claim 18 wherein the adjustment of fluid flow is between fully open to fully closed.

* * * * *